United States Patent [19]

Majima et al.

[11] Patent Number: 4,938,570

[45] Date of Patent: Jul. 3, 1990

[54] METHOD AND SYSTEM FOR DATA DISPLAY AND INPUT VIA DISPLAY SCREEN

[75] Inventors: Osamu Majima, Tokyo; Kazuo Kobayashi, Kanagawa; Ikuo Misao, Kanagawa; Hideshi Tamaru, Kanagawa, all of Japan

[73] Assignee: Sony Corporation, Tokyo, Japan

[21] Appl. No.: 848,458

[22] Filed: Apr. 7, 1986

[30] Foreign Application Priority Data

Apr. 18, 1985 [JP] Japan .................................. 60-83232
Apr. 30, 1985 [JP] Japan .................................. 60-92802

[51] Int. Cl.$^5$ ........................... G02F 1/13; G09F 9/00
[52] U.S. Cl. .................................. 350/351; 350/350 S; 178/18; 340/706
[58] Field of Search ............... 350/351, 331 R, 331 T, 350/334, 320, 350 S; 340/784, 365 C, 712, 786, 705, 706, 707, 708, 709, 713; 365/106, 108; 178/18, 19, 20

[56] References Cited

U.S. PATENT DOCUMENTS

| | | | |
|---|---|---|---|
| 3,886,311 | 5/1975 | Rodgers et al. | 178/18 |
| 4,150,396 | 4/1973 | Hareng et al. | 340/784 |
| 4,275,395 | 6/1981 | Dewey et al. | 340/706 |
| 4,492,819 | 1/1985 | Rodgers et al. | 178/18 |
| 4,571,454 | 2/1986 | Tamaru et al. | 178/18 |
| 4,631,356 | 12/1986 | Taguchi et al. | 340/784 |
| 4,639,720 | 1/1987 | Rympalski et al. | 340/365 C |
| 4,639,722 | 1/1987 | Uzabe et al. | 350/351 |
| 4,653,086 | 3/1987 | Laube | 178/19 |
| 4,696,550 | 9/1987 | Shionoya | 350/351 |
| 4,697,050 | 9/1987 | Farel et al. | 178/18 |
| 4,713,496 | 12/1987 | Kimura et al. | 178/18 |
| 4,730,186 | 3/1988 | Koga et al. | 340/784 |
| 4,764,885 | 8/1988 | Gzeanias et al. | 178/18 |
| 4,777,329 | 10/1988 | Mallicoat | 178/18 |

FOREIGN PATENT DOCUMENTS 0087477 7/1983 European Pat. Off. ............ 350/331
2843191 3/1979 Fed. Rep. of Germany .
0128416 7/1985 Japan ............................... 350/331 R

OTHER PUBLICATIONS

L. Anderson–"Projecting Images with Liquid Crystals", Jul./Aug. 1974, pp. 223-229–Bell Laboratory Record–vol. 52, No. 7.
A. G. Dewey–"A 2000 Character Thermally-Addressed LCD", Apr. 1977, pp. 108-109, SID 77–Digest.
D. Mayan–"Infrared Laser Addressing . . . Information", Jul. 1973, pp. 1007-1013–Procedings of IEEE–vol. 61, No. 7.
T. Urabe–"Laser Addressed LC . . . As a Laser Beam Absorber", Mar. 1983, pp. 1552-1558–J. Appl. Phys. 54(3) Mar. 1983.
A. G. Dewey and J. D. Crow, "The Application of GAAlAS Levers . . . Display", Mar. 1982–pp. 177-18-5–IBM, J. Res. Develop., vol. 26, No. 2–Mar. 86.
J. McDermott–"Liquid Crystal, Lasers . . . Tomorrow's Displays", May 1977, pp. 42, 44, 46–Electronic Design–10–May 10, 1977.

Primary Examiner—Stanley D. Miller
Assistant Examiner—Tai V. Duong
Attorney, Agent, or Firm—Ronald P. Kananen

[57] ABSTRACT

A graphic image display system allows image data input through a data input apparatus to be displayed precisely. The graphic image display system is also able to display graphic images with satisfactorily high resolution. The graphic image display system according to the present invention comprises a scanning laser beam and a thermal liquid crystal cell. The system further includes a transparent data touch tablet secured to a display screen. Auxiliary laser detectors may be added for reading the image written in the liquid crystal cell. Preferably, a common laser optical system is used to generate the display image and to read the written image.

23 Claims, 3 Drawing Sheets

METHOD AND SYSTEM FOR DATA DISPLAY AND INPUT VIA DISPLAY SCREEN

BACKGROUND OF THE INVENTION

The present invention relates generally to a method and system for data display and input through a display monitor screen. More specifically, the invention relates to a system and method for displaying graphic or handwritten images which precisely correspond to images drawn on the display monitor screen by a data input apparatus.

Conventionally, the data input apparatus for such graphic image display systems comprises a tablet, a mouse, and the like. On the other hand, the display monitor for the graphic image display system is usually a cathode-ray-tube (CRT) display. Usually, the combination of a CRT display and a touch tablet is used. In this case, the touch tablet may be located away from the display monitor screen, or may alternatively be placed on the display monitor screen. In either case, data input is performed by means of a tablet pen.

In the former case, some problems are encountered in entering data through the touch tablet. For instance, it is rather cumbersome to input data through a touch tablet separated from the display monitor screen on which input data are reproduced as graphic images. In the latter case, the problems encountered in the former case do not arise since the touch tablet and the display monitor screen are at essentially the same position. However, in this case, due to parallax error caused by the curvature and thickness of the screen glass of the CRT display, deviations between the writing position and display position tend to occur. Furthermore the parallax error varies with errors in gun deflection in the CRT display and the eye position of the operator. In addition, the display position varies with contrast, brightness and/or terrestrial magnetism. Furthermore, in order to input data through a touch tablet mounted on the display monitor screen, the operator tends to move closer to the display screen which tends to add to eye strain. An additional defect in the conventional graphic image display system is the relatively low resolution of the CRT monitor.

SUMMARY OF THE INVENTION

Therefore, it is a principle object of the present invention to provide a graphic image display system which allows position data entered through a data input apparatus to be displayed precisely.

Another object of the present invention is to provide a graphic or handwritten image display system which can display graphic or handwritten images with satisfactorily high resolution.

In order to accomplish the aforementioned and other objects, a graphic image display system according to the present invention comprises a scanning laser beam and a thermal liquid crystal cell. The system further includes a transparent data tablet secured to a display screen. Auxiliary laser detectors may be added for reading the image written in the liquid crystal cell. Preferably, a common laser optical system is used to generate the display image and to read the written image.

According to one aspect of the invention, an image handling apparatus comprises a laser beam generator for generating a laser beam, a thermally writable liquid crystal cell, a laser beam scanning device interposed in the path of the laser beam for scanning the laser beam across the liquid crystal cell, a projection screen, a light source for projecting an image written in the liquid crystal cell onto the projection screen, and a transparent data input tablet overlying the projection screen for electrically sensing a desired point on the image projected on the projection screen.

In the preferred embodiment, the laser beam generator includes a laser beam modulator for modulating the laser beam in accordance with image data stored in an image memory.

Preferably, the image handling apparatus further comprises a laser detector which receives the laser beam passing through the liquid crystal cell on which the image is written.

The transparent data input tablet includes a tablet pen which picks up scanning pulses applied to transparent electrodes of a touch tablet of the transparent data input tablet.

According to another aspect of the invention, a system for displaying images comprises a screen on which the images are to be displayed, first means, including a transparent plate overlaying the screen, for accepting manual input of the position data through the transparent plate and generating image signals, the transparent plate having a plurality of addresses arranged in a predetermined arrangement, an image-forming device having a plurality of pixels arranged in correspondence to the predetermined arrangement of the addresses of the transparent plate, second means for generating a scanning beam to scan the image-forming device according to the input data, and third means for projecting the images formed on the image-forming device on the screen.

The input signal produced by the first means is in the form of an address signal designating a specific pixel corresponding to the address of the transparent plate. The transparent plate comprises a touch tablet associated with a tablet pen serving as a manual input means, and the address signal produced by the first means is representative of the address of a point on the touch tablet plate touched by the tablet pen.

Preferably, the second means comprises a laser beam generator and scanning means for scanning a laser beam generated by the laser beam generator and serving as the scanning beam across the image-forming device. The image-forming device comprises a thermally writable liquid crystal.

The system may further comprise fourth means for erasing the image formed on the image-forming device and thereby erasing the image projected on the screen. The fourth means is selectively operable in a first erasure mode for fully erasing the entire image on the image-forming device and a second erasure mode for erasing a part of the image formed on the image-forming device. In the second erasure mode, the part of the image to be erased is manually designated. The fourth means includes an erasure voltage generator for generating an erasure voltage variable between a given higher voltage in the first erasure mode and a given lower voltage in the second erasure mode.

Preferably, the first given voltage is sufficiently high to erase the entire image on the image-forming device, and the second given voltage is low enough not to erase the image alone. But the second given voltage is sufficiently high to erase points or areas of the image on the input image-forming device in cooperation with the scanning beam.

The system may further comprise fifth means for receiving the image data for storing the data. The fifth means is associated with the second means for receiving the scanning beam for reading out the image data therefrom. The fifth means further includes a synchronization signal generator for storing the image data in conjunction with the synchronization signal.

According to a further aspect of the invention, a method for displaying a graphic image on a display screen, comprises the steps of:

accepting manual input of the graphic data and converting input data into image components, each being representative of the address of an input image component;

providing a thermally writable device including a plurality of pixels, each corresponding to one of a plurality of addresses on the display screen;

generating a laser beam and scanning the thermally writable device on the basis of the input image component indicative data for forming an image corresponding to the input data on the thermally writable device; and projecting the image formed on the thermally writable device on the screen for forming an image. This method further comprises a step of providing a touch tablet overlying the display screen for accepting data input therethrough.

The data input through the touch tablet is performed by means of a tablet pen. Preferably, the thermally writable device comprises a liquid crystal cell.

The method as set forth above further comprises a step of erasing the image formed on the thermally writable device by applying a given erasure voltage. The step of erasing the image on the thermally writable device is performed in a first mode for fully erasing the image and a second mode for partially erasing the image.

Preferably, the method further comprises a step of reading the input image indicative data for storage. The step of reading and storing the input image indicative data includes generation of a synchronization signal and mixing the input image indicative data with the synchronization signal for storage together.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments and are for explanation and understanding only.

In the drawings.

FIG. is a block diagram of the first embodiment of a graphic image display system according to the present invention.

DESCRIPTION OF THE PREFERRED EMBODIMENT

Figure 1:
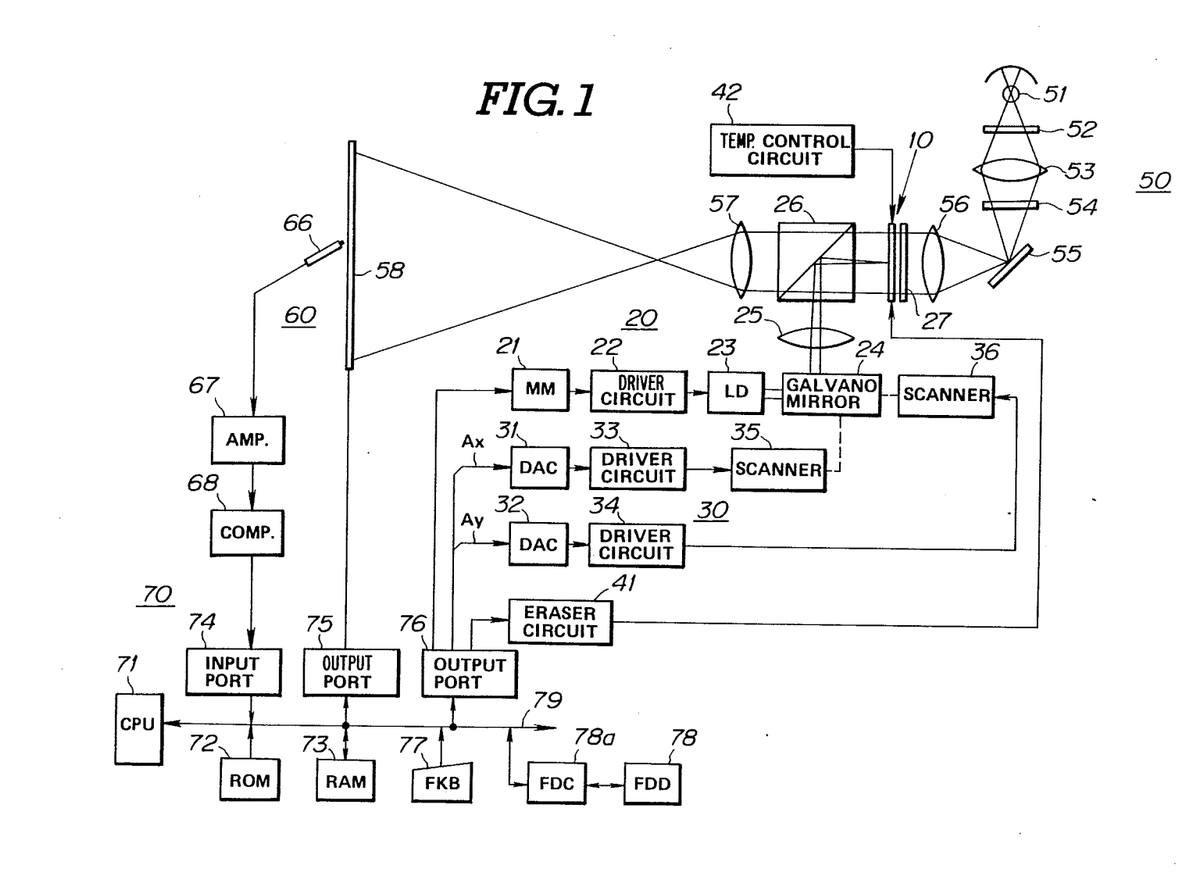

Referring now to the drawings, particularly to FIG. 1, the first embodiment of a graphic image display system, according to the present invention, employs a liquid crystal cell 10. The system also employs a laser beam for writing images on the liquid crystal cell 10. The image written on the liquid crystal cell 10 is projected on a projection screen by a projection means. The image written on the liquid crystal cell 10 and projected on the projection screen is a bi-level monochrome image.

In the embodiment of FIG. 1, the laser beam is focused on the liquid crystal cell 10. The energy of the laser beam is converted into thermal energy which heats the focal point on the liquid crystal cell 10. This heat induces a phase change in the liquid crystal causing disruption of the liquid crystal alignment. After this, by removing or defocusing the laser beam to rapidly cool the cell, that point in the liquid crystal cell is left as an opaque point.

Figure 2:
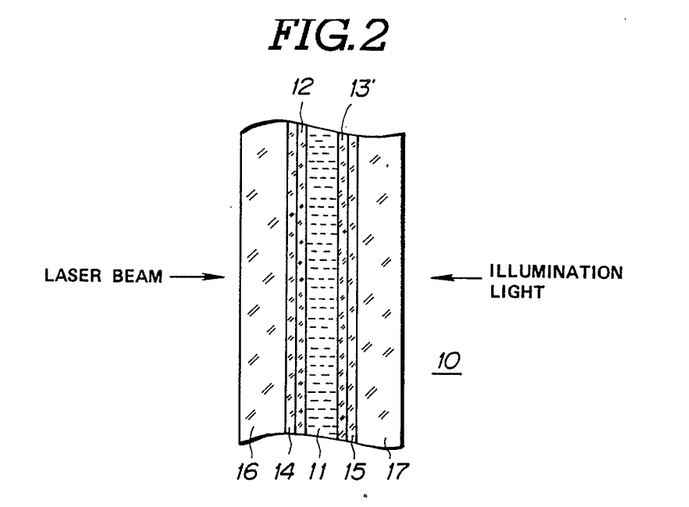
FIG. 2 is a sectional view of a liquid crystal cell employed in the first embodiment of the image display system according to the invention.

FIG. 2 shows the structure of the liquid crystal cell 10 employed in the first embodiment of the image display system. A liquid crystal layer 11 is formed between a pair of aligning layers 12 and 13 by filling the space between the aligning layers 12 and 13 with liquid crystal material. A pair of transparent electrodes 14 and 15 are applied to the outside surfaces of the aligning layer 12 and 13. The transparent electrodes 14 and 15 are actually formed on glass panels 16 and 17 opposing the aligning layers 12 and 13. The glass panel 16 opposes a laser beam source. On the other hand, the glass panel 17 opposes an illumination light source. Therefore, the liquid crystal in the liquid crystal layer 11 is exposed to the laser beam through the glass panel 16 and to the illumination source through the glass panel 17.

In the preferred embodiment, the liquid crystal material used in the liquid crystal layer 11 is a cyano-biphenyl system liquid crystal, such as a mixture of 40 mol percent of octyl-cyano biphenyl, and 60 mol percent of decyl-cyano biphenyl. This cyano-biphenyl system liquid crystal changes phase from smectic A phase to a nematic phase and possibly from a nematic phase to an isotropic phase when the laser beam is focused thereon, depending upon the heat generated by the laser beam.

It may be of interest to note that the phase transition temperature from the smectic A phase to the nematic phase is 44.8° C., and the phase transistion temperature from the nematic phase to the isotropic phase is 45.2° C.

In addition, a dye, such as 1,3-(1, 4-dimethyl-7-isopropyl azulenyl)-cyclobutene diylium, is added to the liquid crystal to improve absorption efficiency and transmission efficiency of the laser beam.

Furthermore, it should be appreciated that the effective area of the liquid crystal cell 10 is a 20 mm ×20 mm, square and that the resolution of the liquid crystal cell is 2000×2000 picture elements.

Returning to FIG. 1, the reference numeral 20 denotes generally an image input means which uses a laser beam to draw an image on the liquid crystal cell 10 as set forth above. The image input means turns the laser beam ON and OFF for each picture element according to the display data. The laser beam is thus focused onto the liquid crystal cell 10 to form an image thereon.

The display data is supplied from a microcomputer system 70. The display data from the microcomputer 70 is fed to a monostable multivibrator 21. The monostable multivibrator 21 generates a write pulse when triggered for each picture element. The pulsewidth of the write pulse generated by the monostable multivibrator 21 is 2.5 μsec, for example. The write pulse from the monostable multivibrator 21 is fed to a laser diode 23 through a driver circuit 22. The laser diode 23 comprises, for example, a GaAlAs semiconductor laser with an output power of 30 mW designed to transmit a beam of near-infrared at a wavelength of 780 μm.

Therefore, the laser diode 23 transmits a laser beam modulated on the basis of the display data from the microcomputer 70. The laser beam from the laser diode 23 is transmitted to the liquid crystal cell 10 through a galvanomirror 24, a lens 25, and a prism 26. A cold filter 27 is provided at the side opposite the side on which the laser beam is focused in order to improve thermal efficiency of heating and cooling the picture elements.

A scanning means 30 scans the laser beam across the liquid crystal cell 10. The scanning of the laser beam follows well-known raster-scan or vector-scan techniques controlled by the microcomputer 70. In order to enable the scanning means 30 to control the scanning of the laser beam across the liquid crystal cell 10, the microcomputer outputs a horizontal address value $A_x$ and a vertical address value $A_y$ representing x- and y-coordinates of the scanning position of the laser beam on the liquid crystal cell 10. The horizontal and vertical address values $A_x$ and $A_y$ are fed to digital-to-analog (D/A) converters 31 and 32 respectively to be converted into analog data and then to the driver circuits 33 and 34 of the scanning means. The scanning means further comprises a horizontal scanner 35 and a vertical scanner 36. The horizontal and vertical scanners 35 and 36 drive the galvanomirror 24 horizontally and vertically respectively to focus the laser beam at the address of the liquid crystal cell 10 designated by the horizontal and vertical address values $A_x$ and $A_y$. In the shown embodiment, since a liquid crystal cell 10 of 2000×2000 picture elements of resolution is employed, the horizontal and vertical address values $A_x$ and $A_y$ are both 11-bit values.

The system also has an eraser circuit 41. The eraser circuit 41 is controlled by the microcomputer 70 to generate a predetermined voltage ER. The voltage ER of the eraser circuit 41 is applied to the electrodes 14 and 15 of the liquid crystal cell 10 to erase the image formed on the liquid crystal cell. In the shown embodiment, the eraser circuit 41 can perform both full erasure, in which it erases the full frame of the image on the liquid crystal cell 10, and partial erasure in which it erases only part of the image on the liquid crystal cell. The imaging, drafting and erasing operations are performed in the following conditions:

| MODE | LASER BEAM | ERASE VOLTAGE ER |
| --- | --- | --- |
| WRITING | MODULATED BY DISPLAY DATA | 0 |
| FULL ERASURE | NONE | 30 to 40 V (HIGH) |
| PARTIAL ERASURE | NOT MODULATED | 5 to 10 V (LOW) |

As will be appreciated from the above table, during partial erasure, a low voltage ER which is lower than that required to erase the image on the liquid crystal cell 10 is applied to the electrodes 14 and 15. At the same time, a laser beam which is not modulated by the display data from the microcomputer, is focused onto and scanned across the part of the liquid crystal cell 10 corresponding to the part of the image to be erased.

The system further comprises a temperature control circuit 42. The temperature control circuit 42 serves to maintain the temperature of the liquid crystal cell 10 at a given constant temperature which is lower than the phase transition temperature from the smectic; A phase to the nematic phase. Specifically, the temperature control circuit 42 holds the liquid crystal cell 10 at a temperature of 43.3° C. which is 1.5° C. lower than the phase transition temperature 44.8°C. Therefore, the liquid crystal in the liquid crystal cell 10 is normally held in the smectic A phase.

A projector means 50 is also provided in the system for projecting the image formed on the liquid crystal cell 10 onto a display screen 58 of a display means 60. The projector means 50 includes a light source, such as a 150W halogen lamp 51. The light from the light source 51 passes through an IR filter 52, a condensor lens 53, a UV filter 54, a mirror 55 and a lens 56, which define a light path. The light from the light source is projected onto the liquid crystal cell 10 through the light path. The projector light falling onto the liquid crystal cell 10 passes through transparent elements of the liquid crystal cell and through the prism 26 to a projection lens 57. The projector light passing through the liquid crystal cell 10 is projected onto the display screen 58 through the projection lens 57. Therefore, the image drawn on the liquid crystal cell 10 is enlarged and projected onto the display screen 58.

This kind of image display system is disclosed in the co-pending U.S. Pat. application Ser. No. 06/504,056, filed on May 6, 1983, and assigned to the common assignee of the present invention. The contents of the U.S. Pat. application Ser. No. 06/504,056 are hereby incorporated by reference for the sake of disclosure. It should be noted that the invention disclosed in the aforementioned co-pending application has also being disclosed in the corresponding European Patent application published under Publication No. 00 87 477, on Sept. 7, 1983. The contents of publication mentioned above are also herein incorporated by reference.

Figure 3:
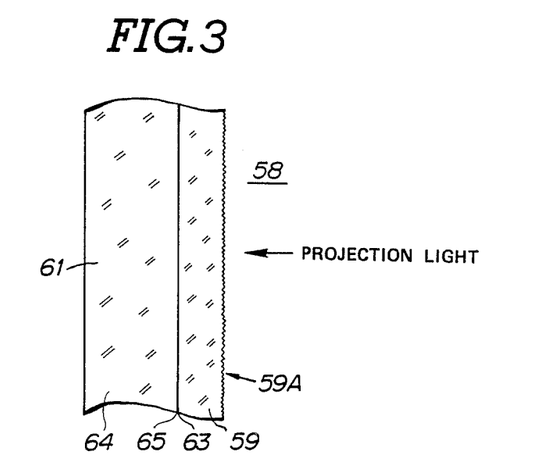
FIG. 3 is a sectional view showing the relationship between a touch tablet panel and a display screen in the first embodiment of the image display system.

The screen 58 serves as a projection screen for the projector means 50. The screen 58 is attached integrally to a tablet plate 61, as shown in FIG. 3. In FIG. 3, the panel 59 is a flat glass panel. The panel 59 is essentially transparent, but has a translucent surface 59A similar to frosted glass on the side opposing the projector means 50. This translucent surface 59A serves as the screen for the projected image. The surface opposite from the translucent surface 59A is transparent and supports a plurality of vertical electrodes 63. Each electrode 63 is in the form of a vertical stripe horizontally spaced from the others. A flat and essentially transparent glass plate 64 is fitted over the surface of the glass plate 59 on which the electrode 63 is formed. The surface of the glass plate 64 in contact with the glass plate 59 is covered with a plurality of horizontal electrodes 65. Each electrode 65 is in the form of a horizontal stripe vertically spaced apart from the others. Although it is not clearly illustrated in the drawings, a transparent insulating layer is formed between the mating surfaces of the glass plates 59 and 64.

In the shown embodiment, the thickness of the glass plate 59 is 1 mm and that of the glass plate 64 is 3 mm. The areas of the glass plates 59 and 64 are selected to form the desired size of the tablet plate 61, e.g. DIN A4 size.

A tip of a tablet stylus or pen 66 has a built-in electrode. The tip electrode of the tablet pen 66 is insulated from the grip. The tip electrode of the tablet pen 66 is designed to detect scanning pulses applied to the electrodes 63 and 65.

The microcomputer 70 comprises a CPU 71, a ROM 72, RAM 73, an input port 74 and output ports 75 and 76. The ROM 72 stores a control program for controlling operation of the preferred embodiment of the image display system. The RAM 73 is adapted for use as a work area and an user area. The ROM 72, the RAM 73, the input port 74 and the output ports 75 and 76 are all connected to the CPU 71 through a system bus 79. Also, a full-keyboard 77 is connected to the CPU through the system bus 79. Furthermore, a floppy disk drive 78 is connected to the CPU through a floppy disk drive control circuit 78a, via the system bus 79.

When the full-keyboard 77 is operated to activate the write mode, the voltage ER is dropped to zero. The microcomputer 70 is responsive to selection of the write mode through the keyboard 77 to generate scanning pulses. The scanning pulses are fed to the electrodes 63 and 65 through the output port 75. Under these conditions, if the touch tablet pen 66 touches the glass plate 64, the tip electrode thereof detects the scanning pulse. The output of the tip electrode of the touch tablet pen 66 passes through an amplifier 67 and a comparator 68 for conversion to a timing signal. The timing signal is fed to the microcomputer 70. The microcomputer 70 derives the coordinates of the point at which the tip electrode of the touch tablet pen touched the touch tablet panel, based on the scanning position specified by the scanning pulses and on the timing signal. Based on the derived coordinates, the address values $A_x$ and $A_y$ are derived by the microcomputer 70. The address values $A_x$ and $A_y$ are output through the output port 76 to the monostable multivibrator 21. The monostable multivibrator 21 is responsive to the address signals $A_x$ and $A_y$ from the microcomputer to output write pulses to the laser diode 23. The laser diode 23 thus transmits a laser beam modulated on the basis of the display data to the picture elements of the liquid crystal cell 10 corresponding to the point on the touch tablet 61 touched by the tip electrode of the touch tablet pen 66. Therefore, the corresponding picture element of the liquid crystal cell 10 is heated to induce the phase change described previously and thus becomes opaque. This opaque image on the liquid crystal cell 10 is projected onto the display screen 58, so that a black dot appears on the screen at the point corresponding to where the tip electrode of the touch tablet pen touched the screen.

Therefore, by manually drawing images or characters on the touch tablet 61 by means of the touch tablet pen 66, the corresponding picture elements of the liquid crystal cell 10 are turned opaque and thus the images or characters drawn on the touch tablet are transferred to the liquid crystal cell. The images or characters formed on the liquid crystal cell 10 are then projected onto the display screen 58.

When an erase mode is designated through the keyboard 77, the given voltage ER is applied to the electrodes 14 and As set forth previously, the voltage ER depends upon the selected erasure mode, i.e. a full erasure mode or a partial erasure mode. When the full erasure mode is designated, the higher voltage is applied to the electrodes 14 and 15 to erase fully the entire image formed on the liquid crystal cell 10. On the other hand, when the partial erasure mode is designated, the lower voltage, which is not high enough to cause erasure of the image by itself, is applied to the electrodes 14 and In this partial erasure mode, only the parts of the image touched by the touch tablet pen are erased.

The preferred embodiment of the image display system also allows entry of data to be displayed on the display from other data sources. For example, as shown in FIG. 1, the floppy disk drive 78 can serve as an outside data source for images. In cases where a floppy disk drive is used as a data source, an associated program in the ROM 72 is executed by the CPU 71 to load from the floppy disk drive 78 into the RAM 73.

The shown embodiment allows various kinds of images, corresponding to manually drawn images or images derived by computer software, to be displayed on the display screen 58 through the liquid crystal cell 10.

Furthermore, since the shown embodiment of the image display system allows erasure of the image on the liquid crystal cell, editing can be performed conveniently.

Also, since the shown embodiment employs a transparent touch tablet plate 61 mounted directly over the display screen, the input position on the touch tablet and the display position on the display screen will always correspond precisely to each other. This makes input of image data through the touch tablet plate quite easy. In addition, since the shown embodiment employs an essentially flat and relatively thin touch tablet and display screen, there will be very little parallax error during manual input of the data or image. Furthermore, since the image on the display screen is a direct projection of the image formed on the liquid crystal cell, less distortion will occur than with conventional CRT displays. This projector type display is free from the influence of terrestrial magnetism, which may cause parallax errors.

Additionally, since the shown embodiment projects the image on the display screen by illuminating light through the liquid crystal cell, no flicker will occur, which will help to avoid eyestrain. According to the preferred embodiment, since the liquid crystal cell 10 has a resolution of $2000 \times 2000$ dots on a DIN A4 screen, the image projected on the display screen will be of very high resolution and thus high quality.

Figure 4:
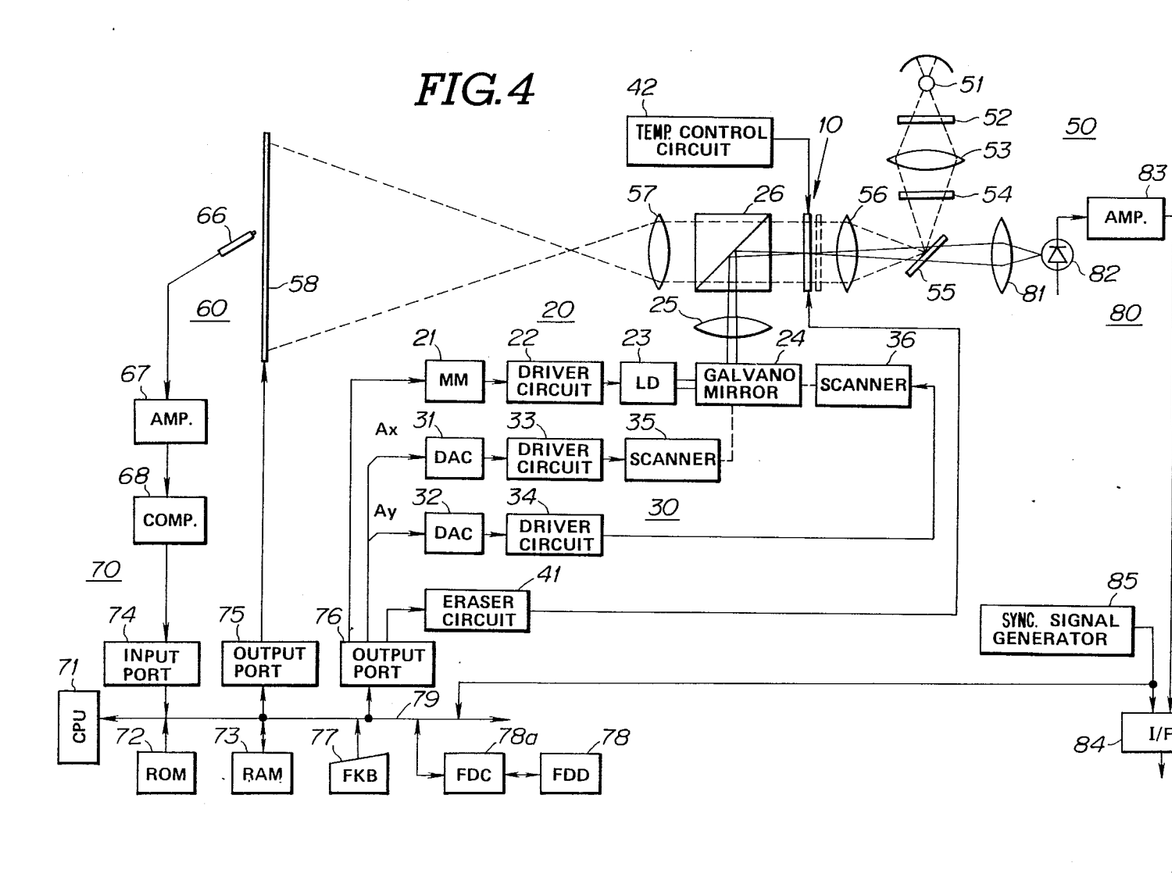
FIG. 4 is a block diagram of the second embodiment of graphic image display system according to the present invention.

FIG. 4 shows the second embodiment of an image display system according to the present invention. The components common to those employed in the first embodiment will be represented by the same reference numerals. In order to simplify the disclosure and avoid the confusion accompanying redundant disclosure, detailed description for the common components will be omitted from the disclosure of the second embodiment below.

It should be noted that, in this second embodiment of the image display system according to the present invention, image data representative of the image on the liquid crystal cell can be read from the liquid crystal cell and stored in an appropriate data storing medium for later reproduction.

In the data reading mode, the light source 51 is turned OFF and the cold filter 27 is removed. The output power of the laser diode 25 is reduced so as not to erroneously write the image. The laser power in reading mode is preferably about 5 mW, for example, which is substantially lower than the laser power, e.g. 30 mW used in the write mode. The laser beam used to read the image data is not modulated. The microcomputer 70 outputs the address signals $A_x$ and $A_y$ so as to scan the laser beam across the liquid crystal cell. The laser beam scan covers the entire area of the liquid crystal cell, for example in the raster scan approach according to for example NTSC Television system standards.

In this embodiment, the mirror 55 must be a half-mirror which allows the laser beam to pass.

A reading means 80 is also provided in the second embodiment of the image display system. The reading means 80 comprises a condensor lens 81 and a photo-diode 82. The condensor lens 81 is located behind the half-mirror 55 to receive the part of the laser beam that passes through the half-mirror 55. The photo-diode 82 is positioned at the focal point of the condensor lens 81. The output of the photo-diode 82 is fed to an interface 84 through an amplifier 83. The interface 84 is also connected to a synchronizing signal generator 85 to receive therefrom a horizontal synchronizing signal and a vertical synchronizing signal. The horizontal and vertical synchronizing signals from the synchronizing signal generator 85 are also sent to the microcomputer 70 for use in controlling the generation of the address values $A_x$ and $A_y$.

With this arrangement, a non-modulated laser beam of reduced power from the laser diode 23 scans the liquid crystal cell 10 on which the image is formed and so passes to the photo-diode 82. Thus, the data representative of the image formed on the liquid crystal cell 10 can be read out according to the detected light intensity at the photo-diode and the address values $A_x$, $A_y$.

In the second embodiment, the image representative data output from the photo-diode 82 is in the form of a luminance signal in the NTSC format. This image data representative signal is fed to the interface through the amplifier and mixed with the horizontal and vertical synchronizing signals from the synchronizing signal generator 85. Through the interface 84, the image data can be stored in an appropriate memory or storage for future editing. The stored data may be reproduced by executing an associated program stored in the ROM in essentially the same manner as disclosed with respect to the use of floppy disks above.

The memory in the microcomputer used to store the image data output through the interface 84 must have sufficient capacity to store 2000×2000 bits of data. On the other hand, the image data can be saved on a floppy disk.

Therefore, according to the second embodiment of the image display system, image editing is facilitated.

While the present invention has been disclosed in terms of the preferred embodiment in order to facilitate a better understanding of the invention, it should be appreciated that the invention can be embodied in various ways without departing from the principles of the invention. Therefore, the invention should be understood to include all possible embodiments and modifications to the shown embodiments which can be embodied without departing from the principles of the invention set out in the appended claims.

What is claimed is:

1. An image handling apparatus comprising:
   a laser beam generating means for generation a laser beam;
   a thermally writable liquid crystal plate for forming a desired visible image by irradiation of said laser beam in a corresponding pattern thereon;
   a laser beam scanning device for scanning said laser beam across desired areas on said liquid crystal plate;
   a projection screen positioned in the vicinity of said liquid crystal plate and adapted to have projected thereon said image in said liquid crystal plate;
   a light source means for generating a light beam to be irradiated onto said liquid crystal plate for said projecting of said written image in said liquid crystal plate onto said projection screen; and
   an image data inputting means, including
   (1) a transparent panel member overlying said projection screen, said transparent panel member comprising a plurality of pixels, each said pixel corresponding to a respective area of said liquid crystal plate such that, if said image written in said liquid crystal plate has a respective image part in an area thereof, said projection of said respective part of said image is to a respective part of said projection screen below the pixel, and
   (2) a manually operable member through which any desired one of said pixels can be selected according to the position of said manually operable member on said transparent panel member, for inputting position data of each said desired pixel on said projection screen for modifying said written image on said liquid crystal plate by said irradiation of said laser beam on the respective area of said liquid crystal plate.

2. An image handling apparatus as recited in claim 1, wherein said laser beam generating means includes a laser beam modulator for modulating said laser beam in accordance with image data stored in an image memory, for writing an image corresponding to said stored image data on said liquid crystal.

3. An image handling apparatus as recited in claim 1, wherein said manually operable member comprises a tablet pen and said transparent panel member comprises two orthogonal pluralities of transparent electrodes, and said tablet pen picks up via said transparent plate scanning pulses applied to said transparent electrodes of said transparent panel member, for said inputting of said position data.

4. An image handling apparatus, comprising:
   a laser beam generating means for generating a laser beam;
   a thermally writable liquid crystal plate;
   a laser beam scanning device interposed in the path of the laser beam for scanning the laser beam across said liquid crystal plate;
   a projection screen;
   a light source for projecting an image written in said liquid crystal plate onto said projection screen;
   an image data inputting means, including a transparent panel member overlying said projection screen and a manually operable member through which desired pixel position data is input, for inputting position data of a desired pixel on said projection screen corresponding to said desired orientation on said liquid crystal plate; and
   a detector for said laser beam oriented to receive said laser beam after passing through said liquid crystal plate on which said image is written, wherein said written image in said liquid crystal plate can be determined.

5. A system for displaying images, comprising:
   a screen on which said images are to be displayed;

a first means, including a transparent plate overlaying said screen, for accepting manual input of position information through said transparent plate and for generating a corresponding position signal, said transparent plate having a plurality of addresses arranged in a predetermined arrangement, each said address corresponding to the location of a predetermined area on said transparent plate;

an image forming device having a plurality of pixels arranged in correspondence to said predetermined arrangement of said addresses of said transparent plate, said image forming device comprising a thermally writable member for accepting thermal input directed to any one of said plurality of pixels, according to said position signal, for forming the image;

a second means for generating a scanning beam to scan said image-forming device to provide said thermal input to each respective pixel according to said position signal, for forming a desired image on said image forming device; and a third means for projecting said image formed on said image-forming device onto said screen;

wherein a predetermined correspondence exists between each said manual input of location information in said transparent plate and each said pixel of said image-forming device for said projecting of said images, and a further correspondence exists between the path for said scanning of said beam and said pixels of said thermally writable member.

6. A system as set forth in claim 5, wherein said position signal produced by said first means is in the form of an address signal designating the one of said pixels corresponding to said address of the location of said manual input of said position information in said transparent plate.

7. A system as set forth in claim 6, wherein said transparent plate comprises a touch tablet associated with a tablet pen for serving as manual input means for said manual input of position information, and said address signal produced by said first means is representative of the address of a point on said touch tablet plate touched by said tablet pen.

8. A system as set forth in claim 5, wherein said second means comprises a laser beam generator and scanning means for scanning a laser beam, generated by said laser beam generator and serving as said scanning beam, across said image-forming device.

9. A system as set forth in claim 6, wherein said image forming device comprises a thermally writable liquid crystal.

10. A system as set forth in claim 5, which further comprises fourth means for erasing the image formed on said image forming device, thereby erasing the image projected on said screen.

11. A system as set forth in claim 10, wherein said fourth means is selectively operable in a first erasure mode for fully erasing the entire image on said image forming device and a second erasure mode for erasing a part of the image formed on said image forming device, in said second erasure mode, the part of said image to be erased being manually designated by said manual input of position information with said first means.

12. A system as set forth in claim 6, wherein said transparent plate comprises a touch tablet associated with a tablet pen with which said manual input of position information is provided, and said address signal produced by said first means is representative of the address of the point on said tablet plate touched by said tablet pen.

13. A system as set forth in claim 12, wherein said fourth means includes an erasure voltage generator for generating an erasure voltage variable between a given higher voltage for use in said first erasure mode and a given lower voltage for use in said second erasure mode.

14. A system as set forth in claim 13, wherein said given higher voltage is sufficiently high to erase the entire image on said image-forming device, and said given lower voltage is low enough not to erase the image alone, said given lower voltage being sufficiently high to erase each selected area of said image on said input image-forming device in cooperation with said scanning beam, each said selected area being specified by said manual input of position information.

15. A method for displaying a graphic image on a display screen, comprising the steps of:

accepting a manual input of graphic data and converting said input graphic data into an image component, each said input graphic data being representative of the address of the respective image component;

providing a thermally writable device comprising a plurality of pixels, each corresponding to one of a plurality of addresses on said display screen;

generating a laser beam and scanning aid thermally writable device on the basis of each said address for forming an image corresponding to said input graphic data on said thermally writable device;

projecting said image formed on said thermally writable device on said screen for forming an image substantially corresponding to said input graphic data; and reading said image for storage.

16. An image handling apparatus comprising:
a laser beam generator for generating a laser beam;
a thermally writable liquid crystal plate;
a laser beam scanning device interposed in the path of the laser beam for scanning the laser beam across said liquid crystal plate;
a projection screen;
a light source for projecting an image written in said liquid crystal plate onto said projection screen;
a transparent data input tablet overlying said projection screen for electrically sensing a desired point on said projection screen; and
means for reading data indicative of said desired point and storing the same.

17. An image handling apparatus comprising:
a laser bean generating means for generating a laser beam;
a thermally writable liquid crystal plate for forming an image in response to irradiation by said laser beam;
a laser beam scanning means for scanning the laser beam across a desired point on said liquid crystal;
a projection screen for receiving a projected image of said liquid crystal plate;
a light source for generating a light beam to be irradiated onto said liquid crystal plate for projecting an image of said liquid crystal plate onto said projection screen;
a transparent electronic coordinate indicating signal generating means overlying said projection screen for producing an electronic coordinate indicating signal at a coordinate of said screen which coordinate corresponds to a coordinate of said liquid crystal plate; and a pen with a tip for sensing said electronic coordinate indicating signal when said pen tip is placed in contact with said transparent electronic coordinate indicating signal generating means.

18. A system for displaying images comprising:

a screen on which said images are to be displayed;

a first means, including a transparent plate overlaying said screen, for accepting manual input of position data through said transparent plate and generating image signals, said transparent plate having a plurality of addresses arranged in a predetermined arrangement;

an image-forming device having a plurality of pixels arranged in correspondence to said predetermined arrangement of said addresses of said transparent plate, said image forming device comprising a thermally writable member for accepting thermal input pointing one of said plurality of pixels for forming the image;

a second means for generating a scanning beam to scan said image-forming device according to the input data for forming images corresponding to said input data;

a third means for projecting said images formed on said image-forming device on said screen; and a fourth means associated with said second means for receiving said image for said data and for receiving said scanning beam for reading out said image data therefrom.

19. A system as set forth in claim 18, wherein said fourth means includes a synchronizing signal generator for storing said image data in conjunction with said synchronizing signal.

20. A method for displaying a graphic image on a display screen, comprising the steps of:

accepting a manual input of graphic data and converting said input date into an image component, each being representative of the address of an input image component;

providing a thermally writable device including a plurality of pixels, each corresponding to one of a plurality of addresses on said display screen;

generating a laser beam and scanning said thermally writable device on the basis of said input data component indicative data for forming an image corresponding to the input data on said thermally writable device;

providing a touch tablet overlying said display screen for accepting image input therethrough;

projecting said image formed on said thermally writable device on said screen for forming an image substantially corresponding to said input data; and reading said input image indicative data for storage.

21. A method for displaying a graphic image on a display screen, comprising the steps of:

accepting a manual input of graphic data and converting said input data into an image component, each being representative of the address of an input image component;

providing a liquid crystal cell including a plurality of pixels, each corresponding to one of a plurality of addresses on said display screen;

generating a laser beam and scanning said liquid crystal cell on the basis of said input data component indicative data for forming an image corresponding to the input data on said liquid crystal cell;

projecting said image formed on said liquid crystal cell on said screen for forming an image substantially corresponding to said input data; and reading said input image indicative data for storage.

22. A method for displaying a graphic image on a display screen, comprising the steps of:

accepting a manual input of graphic data and converting said input data into an image component, each being representative of the address of an input image component;

providing a thermally writable device including a plurality of pixels, each corresponding to one of a plurality of addresses on said display screen;

generating a laser beam and scanning said thermally writable device on the basis of said input data component indicative data for forming an image corresponding to the input data on said thermally writable device;

projecting said image formed on said thermally writable device on said screen for forming an image substantially corresponding to said input data;

reading said input image indicative data for storage; and erasing the image formed on said thermally writable device by applying a given erasure voltage.

23. A method for displaying a graphic image on a display screen, comprising the steps of:

accepting a manual input of graphic data and converting said input data into an image component, each being representative of the address of an input image component;

providing a thermally writable device including a plurality of pixels, each corresponding to one of a plurality of addresses on said display screen;

generating a laser beam and scanning said thermally writable device on the basis of said input data component indicative data for forming an image corresponding to the input data on said thermally writable device;

projecting said image formed on said thermally writable device on said screen for forming an image substantially corresponding to said input data; and reading and storing said input image indicative data, including generation of a synchronizing signal and mixing said input image indicative data with said synchronizing signal for storage together.

* * * * *